United States Patent
Bhatt et al.

(10) Patent No.: US 11,093,126 B2
(45) Date of Patent: Aug. 17, 2021

(54) DROP ZONE PREDICTION FOR USER INPUT OPERATIONS

(71) Applicant: Adobe Inc., San Jose, CA (US)

(72) Inventors: Sameer Bhatt, Noida (IN); Abhishek Shah, Delhi (IN)

(73) Assignee: Adobe Inc., San Jose, CA (US)

( * ) Notice: Subject to any disclaimer, the term of this patent is extended or adjusted under 35 U.S.C. 154(b) by 187 days.

(21) Appl. No.: 15/487,221

(22) Filed: Apr. 13, 2017

(65) Prior Publication Data

US 2018/0300036 A1 Oct. 18, 2018

(51) Int. Cl.
*G06F 3/0486* (2013.01)
*G11B 27/34* (2006.01)
*G11B 27/031* (2006.01)

(52) U.S. Cl.
CPC .......... *G06F 3/0486* (2013.01); *G11B 27/031* (2013.01); *G11B 27/34* (2013.01)

(58) Field of Classification Search
CPC .................................................. G06F 3/0486
USPC ........................................................ 715/769
See application file for complete search history.

(56) References Cited

U.S. PATENT DOCUMENTS

| | | | | |
|---|---|---|---|---|
| 5,870,079 A * | 2/1999 | Hennessy | ........... | G06F 3/04812 345/157 |
| 6,717,600 B2 * | 4/2004 | Dutta | ................. | G06F 3/04842 715/856 |
| 8,621,395 B2 * | 12/2013 | Bau | ..................... | G06F 3/04842 715/856 |
| 2004/0025180 A1 * | 2/2004 | Begeja | ............... | H04N 7/17318 725/46 |
| 2007/0064004 A1 * | 3/2007 | Bonner | ............... | G06F 3/04883 345/442 |
| 2008/0077874 A1 * | 3/2008 | Garbow | ................ | G06F 3/0486 715/764 |

(Continued)

OTHER PUBLICATIONS

Baudisch et al., Drag-and-Pop and Drag-and-Pick: techniques for accessing remote screen content on touch- and pen-operated systems, 2003, m.w.patrickbaudisch.com publications, pp. 1-8, http://m.w.patrickbaudisch.com/publications/2003-Baudisch-Interact03-DragAndPop.pdf (Year: 2003).*

(Continued)

*Primary Examiner* — Nicholas McFall
*Assistant Examiner* — Terri L Filosi
(74) *Attorney, Agent, or Firm* — FIG. 1 Patents (57) ABSTRACT

A digital medium environment is described to improve moving graphical user interface objects using predictive drop zones that are generated based on user input operations. In one example, a user input processing system receives user input, such as selection and movement of a graphical object. The user input processing system monitors the user input to determine velocity, acceleration, location, and direction of the graphical object as moved by the user input. From the monitoring, the user input processing system continuously determines a location for a predicted drop zone in the user interface that represents an ending point for the movement. The predicted drop zone is then rendered on the user interface in real-time until termination of the input, at which point the user input processing system moves the graphical object to the location of the predicted drop zone, rather than to a pointing device location.

21 Claims, 8 Drawing Sheets

(56) References Cited

U.S. PATENT DOCUMENTS

| | | | |
|---|---|---|---|
| 2009/0113330 A1* | 4/2009 | Garrison | G06F 3/0486 |
| | | | 715/769 |
| 2009/0276701 A1* | 11/2009 | Nurmi | G06F 3/0238 |
| | | | 715/702 |
| 2013/0181908 A1* | 7/2013 | Santiago | G06F 3/0488 |
| | | | 345/173 |
| 2014/0157189 A1* | 6/2014 | Morita | G06F 3/0482 |
| | | | 715/784 |
| 2016/0140091 A1* | 5/2016 | Bhat | G06F 3/0482 |
| | | | 715/854 |
| 2016/0170600 A1* | 6/2016 | Horiike | G06F 3/0486 |
| | | | 715/769 |
| 2017/0139556 A1* | 5/2017 | Josephson | G06F 3/0482 |

OTHER PUBLICATIONS

Khan et al., A Remote Control Interface for Large Displays, Oct. 24-27, 2004, UIST '04, vol. 6, Issue 2, pp. 1-10, https://dl.acm.org/citation.cfm?id=1029655 (Year: 2005).*

Nacenta et al., A Comparison of Techniques for Multi-Display Reaching, Apr. 2-7, 2005, CHI 2005, pp. 1-10, http://hci.usask.ca/publications/2005/p114-nacenta.pdf (Year: 2005).*

Bezerianos et al., The Vacuum: Facilitating the Manipulation of Distant Objects, Apr. 2-7, 2005, CHI 2005, pp. 1-10, http://www.dgp.toronto.edu/people/ravin/papers/chi2005_vacuum.pdf (Year: 2005).*

"Acceleration—Wikipedia", Retrieved at: https://en.wikipedia.org/wiki/Acceleration—on Nov. 30, 2016, 5 pages.

"Velocity—Wikipedia", Retrieved at: https://en.wikipedia.org/wiki/Velocity—on Nov. 30, 2016, 5 pages.

\* cited by examiner

DROP ZONE PREDICTION FOR USER INPUT OPERATIONS

BACKGROUND

Advances in computing technology enable a user to interact with and control a computing device using graphical user interfaces rather than textual commands. A graphical user interface visually presents information to the user in the form of a graphical object (e.g., icon, window, and so on) that the user can select and move to a different location of the user interface. For instance, a user interface for a video editing application may include a timeline of different scenes for the video that are each represented as graphical objects. The user can reorganize the different scenes by selecting and moving a scene to a different point on the timeline in the user interface. Similarly, the user might select and move different graphical objects representing scene transitions to define a visual transition between scenes of the video.

Conventional techniques used to select and move a graphical object in a user interface require the user to precisely identify a location where the graphical object is to be moved. For example, the user must move a pointing device, such as a mouse, a finger on a touchscreen, and so on, to the precise location on the user interface in order to move the graphical object to that location. This process becomes more tedious and cumbersome when the user needs to move many graphical objects or needs to move a graphical object to a distant location in the user interface. Although techniques have been developed to address this slow and complicated process, these techniques have numerous drawbacks.

In one conventional example, when a graphical object is moved to a prohibited area, such as an area occupied by another graphical object, the graphical object is automatically repositioned outside the prohibited area. Although this prevents the user from having to repeat the entire movement operation, it leads to confusion by moving the graphical object to a different location without informing the user of the repositioning. In another conventional example, a permitted area is highlighted as the graphical object moves over the permitted area to identify a possible automatic repositioning. This still requires the user to move the pointing device to the permitted area, and remains a slow process. Accordingly, conventional techniques for moving graphical objects remain cumbersome, tedious, and unintuitive.

SUMMARY

A digital medium environment is described to improve moving graphical user interface objects using predictive drop zones that are generated based on user input operations. In one example, a user input processing system is implemented at least partially in hardware of a computing device. The user input processing system receives user input, such as selection and movement of a graphical object. The user input processing system monitors the received user input and, from the user input, determines a velocity, an acceleration, a location, and a direction of the user input that moves the graphical object. The user input processing system then determines a location for a predicted drop zone in the user interface that represents an ending point for the movement based on the velocity, acceleration, location, and direction of the input. A drop zone output module is then employed to visually render the predicted drop zone on the user interface. The predicted drop zone is rendered in real-time until the user input processing system detects termination of the user input, at which point the user input processing system moves the graphical object to the location of the predicted drop zone, rather than to a pointing device location.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

When moving a graphical object in a user interface, such as moving a media clip along a timeline of media clips, precise user input is required to control an ending location of the graphical object. Each movement of a graphical object requires user input to select the object, manually move the object to a different location in the user interface, and release the object at the different location. Conventional techniques to do so, however, are cumbersome and tedious, particularly in scenarios where the user needs to move a large number of graphical objects.

Accordingly, drop zone predicting techniques and systems are described. In order to reduce an amount of time and precision otherwise required to move a graphical object to a different location in a user interface, a computing device continuously monitors user input as it is received. From the monitored user input, characteristics describing motion of the user input on the user interface are determined, such as a velocity of the input, an acceleration of the input, a location of the input on the user interface, and a direction of the input relative to the user interface. These characteristics are quantified as input data that is useable to determine a location in the user interface that the computing device predicts to be the likely intended ending point of the graphical object, as moved by the user input.

The computing device visually renders a predicted drop zone at the target location on the user interface to inform a user as to where the graphical object will end up if the user input is continued. For instance, when the computing device detects an increase in acceleration of the graphical object from the monitored user input, the predicted drop zone is rendered at a greater distance from a current location of the graphical object. Conversely, when the computing device detects a decrease in acceleration of the graphical object from the monitored user input, the predicted drop zone is rendered at a lesser distance from the current location of the graphical object. Thus, the computing device dynamically updates a location of the predicted drop zone in real-time as user input is received.

Upon detecting termination of the user input, such as a release of the selected graphical object, the computing device automatically moves the graphical object to the determined location indicated by the predicted drop zone. Thus, the computing device enables movement of the graphical object from a first location to a second location in the user interface without requiring a user to manually move the graphical object all the way from the first location to the second location. Further, by visually rendering the predicted drop zone, the computing device informs a user where the graphical object will be ultimately placed before termination of the user input. This avoids repositioning the graphical object without first informing the user and enables a user to accurately move the graphical object as intended during a single input, rather than requiring multiple attempts and guesses. In this manner, the techniques and systems described herein enable convenient and intuitive interaction with graphical user interface objects. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Terms

The term "user input" refers to any command initiated by a user to control functionality of or interact with a computing device. Examples of user inputs are commands received via an input device such as a touchscreen, a mouse, a keyboard, a microphone, and so on.

The term "user interface" refers to the means by which a user and a computing device interact through implementation of display devices such as computer screens, televisions, projectors, wearable light guides, and so on.

The term "graphical object" refers to any element visually displayed by a display device. Examples of graphical objects are windows, icons, menus, images, media clips, cursors, and so on.

The term "predicted drop zone" refers to a location on a user interface that visually indicates an estimated ending location for a graphical object while the graphical object is being moved by user input. For example, a predicted drop zone for a graphical object undergoing a drag and drop operation indicates an estimated location where the graphical object is to be dropped. An estimated location where the graphical object is to be dropped is distanced [FIG. 1, 126] from a current location of the graphical object based on monitored user input data describing motion of the graphical object from a starting location to current location [FIG. 1, 122]. Monitored user input data includes a velocity of the user input, an acceleration of the user input, a location of the graphical object in the user interface, and a direction of the user input relative to the user interface. Thus, a location of the predicted drop zone changes based on changing monitored user input data. A predicted drop zone for a moving graphical object can include a display of the graphical object at the predicted ending location [FIG. 1, 124] to inform a user where the graphical object will be moved upon termination of the user input. Alternatively, in situations where display of the entire graphical object at the predicted drop zone would otherwise conflict with display of different graphical objects in the user interface, the predicted drop zone can be resized to visually indicate where the graphical object will be moved relative to other graphical objects, such as between two different graphical objects [FIGS. 4A and 4B, 410, 412, 414, 416, 418, 420, or 422; FIG. 5, 506 or 510].

Example Environment

Figure 1:
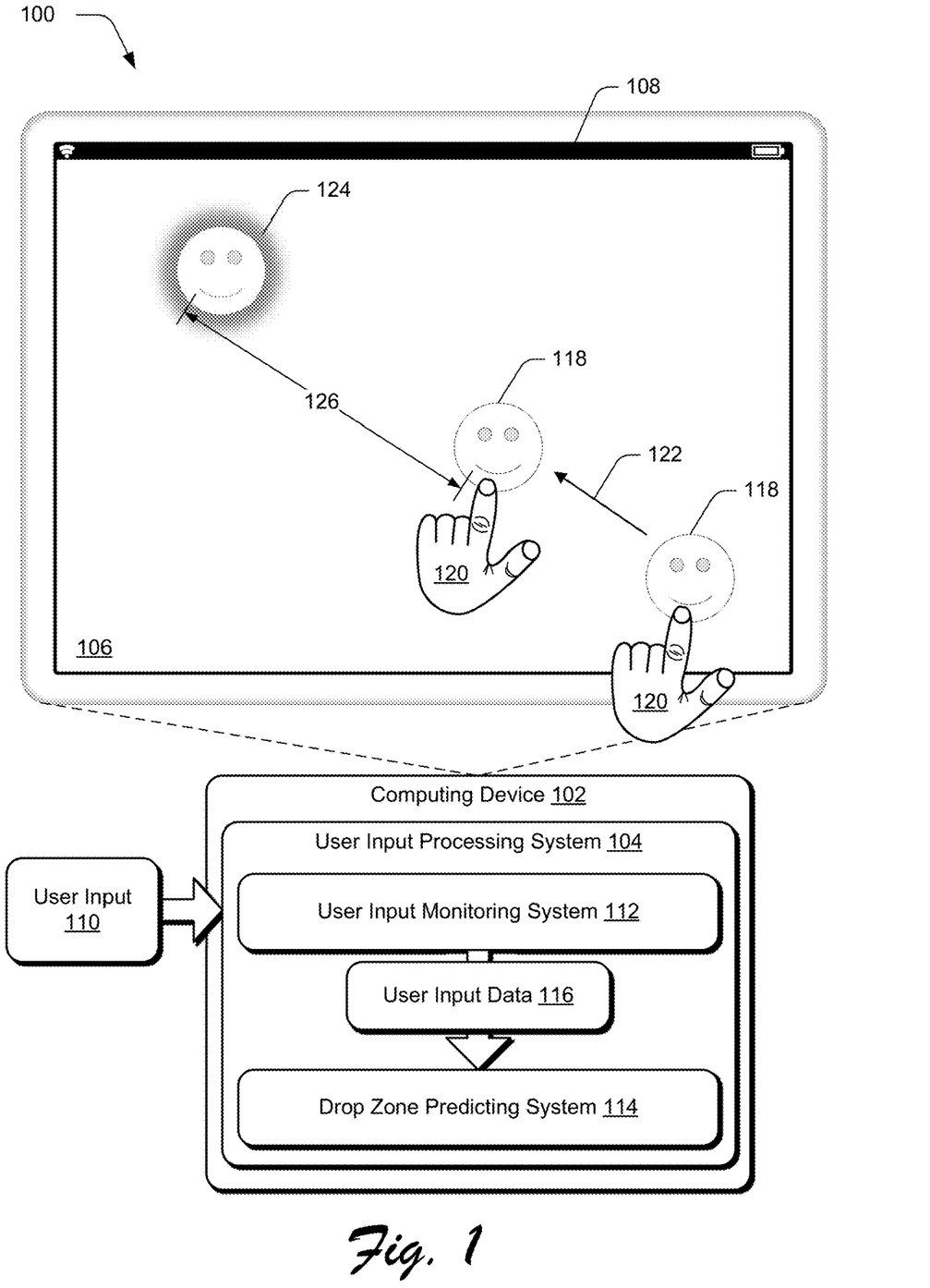
FIG. 1 is an illustration of an environment in an example implementation that is operable to employ predictive drop zones for user input operations as described herein.

FIG. 1 is an illustration of an environment 100 in an example implementation that is operable to employ predictive drop zones for user input operations using the techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business.

The computing device 102 is illustrated as including a user input processing system 104. The user input processing system 104 is implemented at least partially in hardware of the computing device 102 (e.g., using a processing system and computer-readable storage media) to process received user input and visually render a predicted drop zone for the user input in a user interface 106 of a display device 108. Processing user input includes detecting initiation of user input with a graphical object, monitoring the user input with the graphical object, rendering a predicted drop zone at a determined location based on the monitoring, and moving the graphical object to the determined location upon termination of the user input. Although illustrated as implemented locally at the computing device 102, functionality of the user input processing system 104 may also be implemented as whole or part via functionality available via a network, such as part of a web service or "in the cloud" as further described in relation to FIG. 8.

An example of functionality incorporated by the user input processing system 104 to generate predictive drop zones based on user input is illustrated as a user input monitoring system 112 and a drop zone predicting system 114. The user input monitoring system 112 is implemented at least partially in hardware (e.g., processing system and computer-readable storage media) of the computing device 102 to detect user input 110 at the computing device 102. The user input monitoring system 112, for instance, monitors the user input 110 to generate user input data 116 that describes user interaction with a graphical object 118 displayed in the user interface 106.

A user, for instance, may select the graphical object 118 with a hand 120, a pointer controlled by a mouse, and so on. After selecting the graphical object 117, the user can move the graphical object 118 to a different location in the user interface, indicated by the arrow 122. The user input monitoring system 112 monitors the user input 110 as the user moves the graphical object 118 within the user interface 106 and, from the monitored user input 110, generates user input data 116 to describe various characteristics of the user input 110. For instance, the user input monitoring system 112 can generate user input data 116 that specifies a velocity, an acceleration, a location, and a direction of the user input 110. The user input monitoring system 112 constantly monitors the user input 110 as it is received by the computing device 102 to generate user input data 116 in real-time as the user moves the graphical object 118.

The user input monitoring system 112 then provides the generated user input data 116 to the drop zone predicting system 114. The drop zone predicting system 114 is implemented at least partially in hardware (e.g., processing system and computer-readable storage media) of the computing device 102 to visually render a predicted drop zone 124 in the user interface 106. Based on the user input data 116, the drop zone predicting system 114 determines a location in the user interface 106 that represents an ending location for the user input 110 with the graphical object 118. The drop zone predicting system 114 renders the predicted drop zone 124 at the determined location in the user interface 106 to visually indicate where the graphical object 118 will end up if the user input 110 is continued. The predicted drop zone 124 is rendered at a distance 126 from a current location of the graphical object 118 as moved by the user input 110 based on the user input data 116, such as a velocity, an acceleration, a location, and a direction of the user input 110.

Thus, the drop zone predicting system 114 visually indicates a predicted ending location for a graphical object while the user is moving the graphical object. Upon detecting termination of the user input 110, the user input processing system 104 causes the graphical object 118 to be moved to the determined location in the user interface 106 indicated by the predicted drop zone 124. Consequently, the user input processing system 104 enables a user to move a graphical object to a different location in a user interface without manually dragging the graphical object all the way to the different location. In implementations, the user input processing system 104 determines whether the predicted drop zone 124 conflicts with a display location of other graphical objects in the user interface 106 and automatically adjusts a location of the predicted drop zone 124 to avoid moving the graphical object 118 to a location occupied by another graphical object. An example operation of the user input processing system is described as follows and shown in a corresponding figure.

Figure 2:
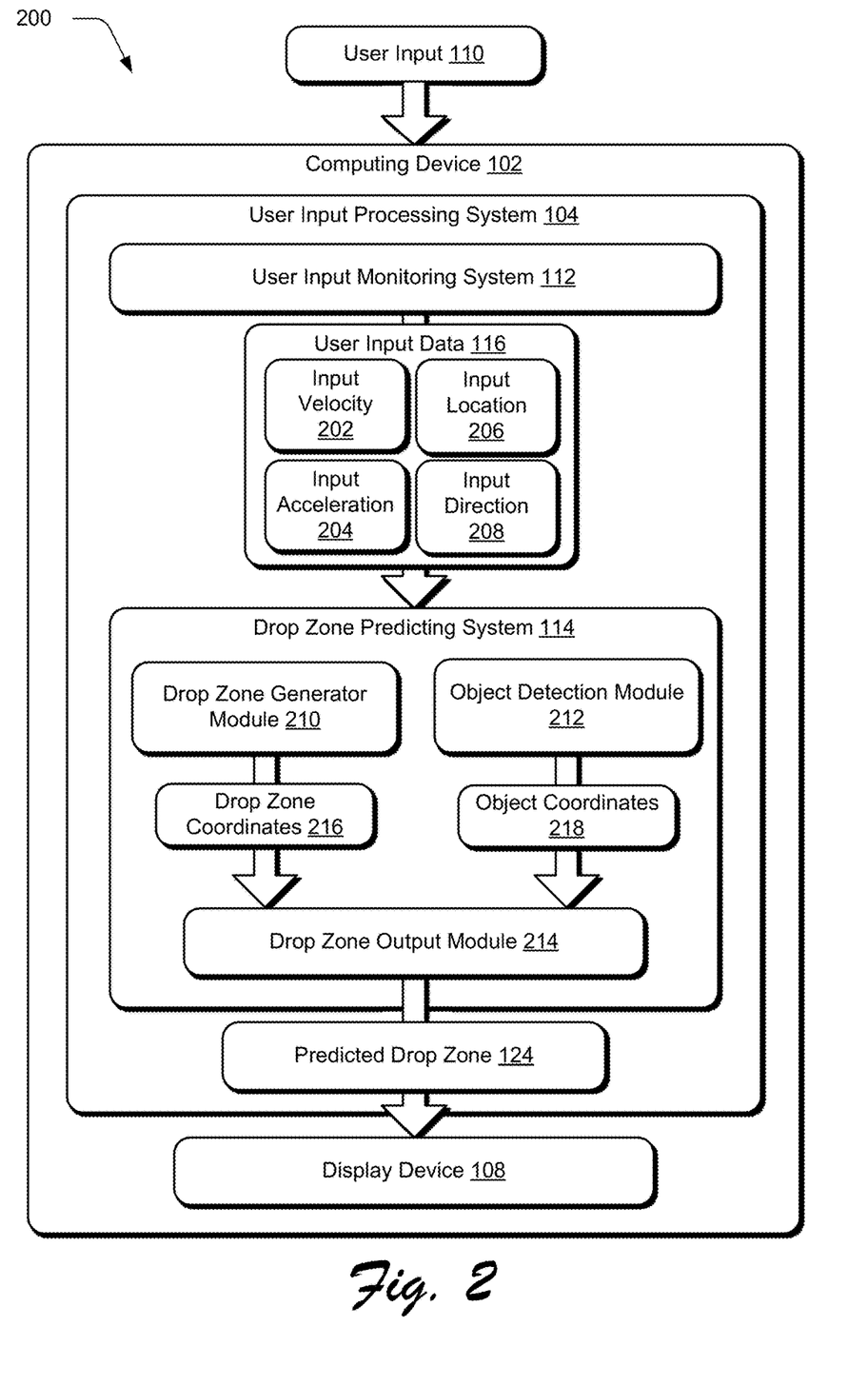
FIG. 2 depicts a system in an example implementation showing operation of a drop zone predicting system of FIG. 1 in greater detail.

FIG. 2 depicts a system 200 in an example implementation showing operation of the user input processing system 104 of FIG. 1 in greater detail. To begin, a user interacts with a computing device 102 implementing the user input processing system 104 via user input 110 to select and move a graphical object displayed in a user interface of the computing device 102. Upon detecting initiation of the user input 110, the user input monitoring system 112 generates user input data 116 to describe various characteristics of the user input 110. For instance, the user input monitoring system 112 generates user input data 116 describing an input velocity 202, an input acceleration 204, an input location 206, and an input direction 208 of the received user input 110. The input velocity 202 quantifies a speed of a graphical object as moved by the received user input 110 relative to the input direction 208. The input direction 208 describes a direction of the graphical object's motion relative to a user interface displayed by the computing device 102. The input acceleration 204 quantifies a rate of change of the input velocity 202 per unit of time of the graphical object as moved by the received user input 110. The input location 206 identifies a location of the graphical object in the user interface as the graphical object is moved by the received user input 110. Thus, the user input monitoring system 112 monitors the user input 110 and, from the monitored user input 110, generates user input data 116 that describes a current status of the user input 110 in real-time as it is received by the computing device 102.

Based on this user input data 116, the drop zone predicting system 114 determines a location for a predicted drop zone 124 in a user interface of the computing device and visually renders the predicted drop zone 124 in the user interface. To do so, the drop zone predicting system 114 implements a drop zone generator module 210, which is representative of functionality to determine a location for the predicted drop zone 124 based on the user input data 116.

For instance, the drop zone generator module 210 may determine a location for the predicted drop zone 124 by determining a distance that a graphical object moved by the user input 110 would travel in a user interface based on the input velocity 202 and the input acceleration 204. In accordance with one or more implementations, this distance, such as the distance 126 of FIG. 1, can be calculated by modeling the input velocity 202 as a function of time beginning at the initiation of the user input 110 and computing the distance as a definite integral of the input velocity 202 as a function of time. The determined location for the predicted drop zone 124 is then defined as being located in the user interface at the computed distance from the input location 206.

In accordance with one or more implementations, the distance between the determined location for the predicted drop zone 124 and the input location 206 indicating a current position of the graphical object can be further adjusted based on the input acceleration 204 determined from the user input 110 and included in the user input data 116. For instance, if the input acceleration 204 indicates that the user input 110 is decelerating, the calculated distance is reduced, such that the determined location for the predicted drop zone 124 is located closer to a current position of the input location 206. Similarly, if the input acceleration 204 indicates that the user input is increasing in acceleration, the calculated distance is increased, such that the determined location for the predicted drop zone 124 is located further from a current position of the input location 206. In addition, if the input acceleration 204 indicates that the user input 110 is moving the graphical object at a constant velocity, the calculated distance is not changed from the definite integral of the input velocity 202 modeled as a function of time.

In addition to determining a distance between a current location of the graphical object being moved by the user input 110 and the predicted drop zone 124, the drop zone generator module 210 determines a direction relative to the current location of the graphical object for rendering the predicted drop zone 124. For instance, the drop zone generator module 210 uses the input direction 208 that is determined from monitoring the user input 110 to define a direction for the determined location of the predicted drop zone 124 relative to a position of the graphical object upon initiation of the user input 110 with the graphical object. Thus, the drop zone generator module 210 determines the location for the predicted drop zone 124 in terms of a vector describing a distance and a direction from an original position of the graphical object upon initiation of the user input 110.

The drop zone generator module 210 generates drop zone coordinates 216 to define this determined location relative to a display area of the user interface. For instance, the drop zone coordinates 216 may specify one or more pixels of the user interface to be visually altered in a manner that displays the predicted drop zone 124 for user viewing. In implementations, the drop zone coordinates 216 depend on a size of the graphical object being moved by the user input 110, such that the predicted drop zone 124 is visually rendered as having a similar size to the graphical object. The drop zone coordinates 216 are provided to the drop zone output module 214 so that the drop zone predicting system 114 can render the predicted drop zone 124 for display on a display device 108 of the computing device 102.

In order to account for other graphical objects that may be currently displayed on a user interface of the display device 108, the drop zone predicting system 114 includes an object detection module 212. The object detection module 212 is representative of functionality to detect and identify a location of a graphical object displayed on a user interface that may otherwise conflict with rendering the predicted drop zone 124 at the determined location indicated by the drop zone coordinates 216. For instance, the object detection module 212 can identify that a user interface is currently displaying two other graphical objects in addition to the graphical object being moved by the user input 110. The object detection module 212 generates object coordinates 218 to identify one or more areas in the user interface currently occupied by the other graphical objects and provides the object coordinates 218 to the drop zone output module 214.

The drop zone output module 214 compares the received drop zone coordinates 216 and the received object coordinates 218 to determine whether a conflict exists between the received coordinates. If no conflict exists, the drop zone output module 214 causes the predicted drop zone 124 to be rendered at the display device 108 at the drop zone coordinates 216. However, if a conflict between the drop zone coordinates 216 and the object coordinates 218 is detected, the drop zone output module 214 takes corrective action to prevent a conflicting display between the predicted drop zone 124 and another graphical object. The corrective action may include snapping an outer edge of the predicted drop zone 124 to an outer edge of another graphical object, such that the predicted drop zone 124 is rendered as adjacent to the other graphical object rather than overlapping the other graphical object. Alternatively, if the drop zone output module 214 determines that the drop zone coordinates 216 are located generally in between two other graphical objects, the drop zone output module 214 reduces a display size of the predicted drop zone 124 such that the predicted drop zone 124 is rendered in an area between the two other graphical objects. Alternatively, the drop zone output module 214 may ignore the object coordinates 218, such that the predicted drop zone 124 is visually rendered as overlapping another graphical object displayed on the user interface.

Because the drop zone predicting system 114 continuously generates the user input data 116 in real-time from the received user input 110 that moves a graphical object about a user interface, the drop zone output module 214 updates a location for the predicted drop zone 124 on the display device 108 in real-time as the user input 110 is received. In this manner, a user is able to visually identify an ending location on the user interface without needing to physically move the graphical object all the way to that ending location. When the user input processing system 104 detects termination of the user input 110, the user input processing system 104 automatically moves the graphical object to the determined location in the user interface indicated by the predicted drop zone 124. Thus, the user input processing system 104 advantageously reduces an amount of time and effort otherwise required by a user to move a graphical object from a starting location to an ending location in a user interface.

Figure 3:
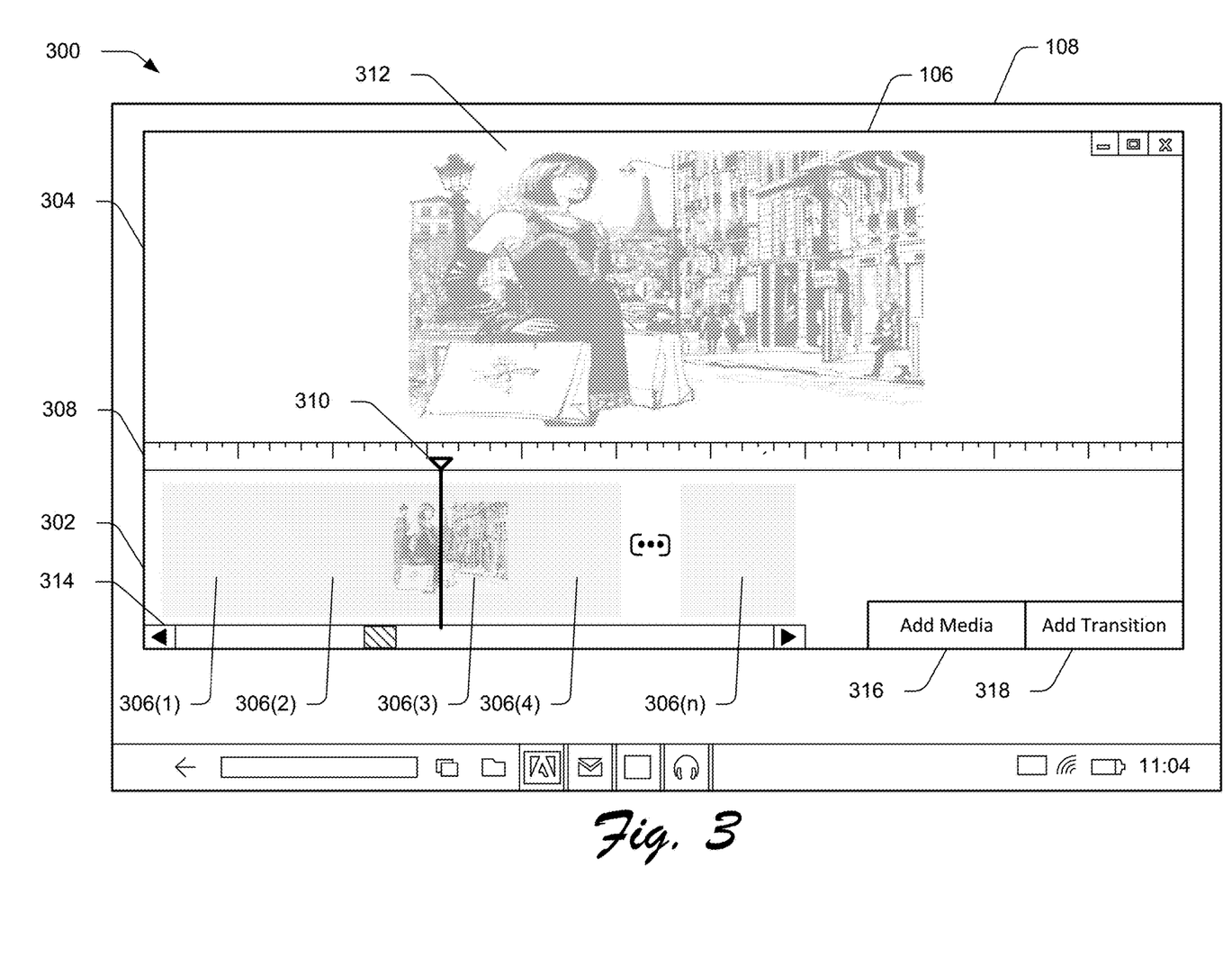
FIG. 3 depicts an example implementation showing a user interface of a display device in which predictive drop zones for user input operations can be implemented.

FIG. 3 depicts an example implementation 300 of the user interface 106 and the display device 108 of FIG. 1 that may be used to implement the predictive drop zone techniques describe herein. In the illustrated example, the user interface 106 is configured as a video editor interface that includes a timeline portion 302 and a preview portion 304. The timeline portion includes a visual representation of different scenes 306(1), 306(2), 306(3), 306(4) . . . 306(n) for a video that are each represented as graphical objects in the user interface 106. As described herein, 'n' represents any integer and thus enables the user interface 106 to support editing for long videos including many scenes as well as short videos including few scenes. The timeline portion 302 of the user interface includes a timeline ticker 308 that visually indicates timing information, such as a time position of a scene in the video, a length of a scene, a length of the overall video, and so on. The timeline ticker 308 includes an indicator 310 that can be moved by a user to navigate to a specific point in the timeline of different scenes 306(1), 306(2), 306(3), 306(4) . . . 306(n).

The preview portion 304 of the user interface 106 includes a preview display 312 of a portion of media in the timeline portion 302 specified by the indicator 310. Thus, the preview portion 304 enables a user to view an enlarged preview display 312 of the portion of media that may otherwise be too small for adequate viewing in the timeline portion 302. By including both the preview portion 304 and the timeline portion 302 in the user interface 106, a user can navigate among different scenes of a video at a coarse granularity in the timeline portion 302 and a fine granularity in the preview portion 304.

In order to accommodate a large number of graphical objects representing individual scenes of a video, the timeline portion 302 optionally includes a scrollbar 314 that is useable to navigate to view a video scene positioned beyond a current display area of the timeline portion 302. Although illustrated as a single scrollbar oriented horizontally in the user interface 106, the scrollbar 314 is representative of any number of scrollbars oriented in any number of directions in one or more of the timeline portion 302 or the preview portion 304 of the user interface 106. Thus, the scrollbar 314 enables clear display of numerous graphical objects in the user interface 106 without having to shrink a display size of the graphical objects to fit within a display area of the display device 108.

The user interface 106 additionally includes controls for editing a video by adding media via control 316 or adding a transition via control 318. Controls 316 and 318 are representative of functionality that can be selected to display a list of one or more media objects or transitions that can be inserted into the video via the timeline portion 302. For instance, selecting the 'Add Media' control 316 may cause display of video objects, image objects, audio objects, or combinations thereof that can be dragged and dropped to various points on the video timeline illustrated in the timeline portion 302. Similarly, the 'Add Transition' control 316 may cause display of various transition objects that define a transition to occur between two or more video scenes in the timeline portion 302. For instance, a user could drag a graphical object representing a visual transition to a point in the timeline portion 302 in between scenes 306(1) and 306(2) to adjust a manner in which scene 306(1) transitions to scene 306(2) during playback. Thus, the user interface 106 enables a user to intuitively edit a video by adding and rearranging media in a timeline and specifying transitions between scenes of a video during playback. Further discussion of implementing predicted drop zones in the example user interface 106 is described in relation to FIGS. 4A, 4B, 4C, and 5 in the following description.

Figure 4A:
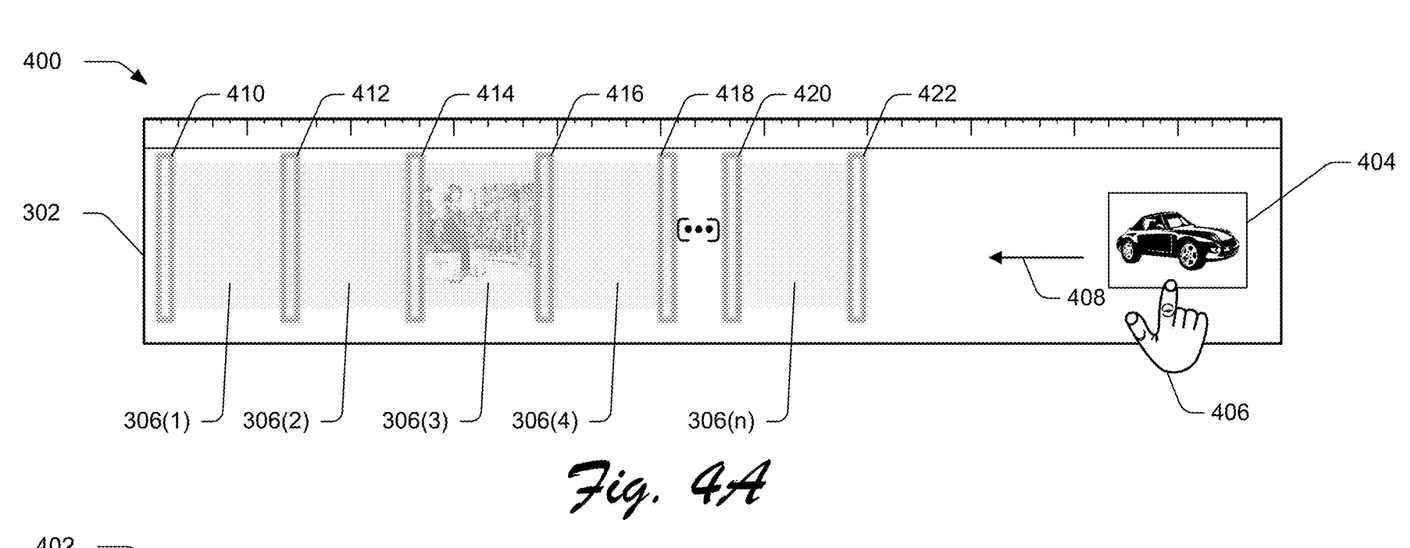
FIG. 4A depicts an example implementation in which a drop zone output module of FIG. 2 is employed to determine potential drop zones based on user input operations with a graphical object displayed in the example user interface of FIG. 3.
Figure 4B:
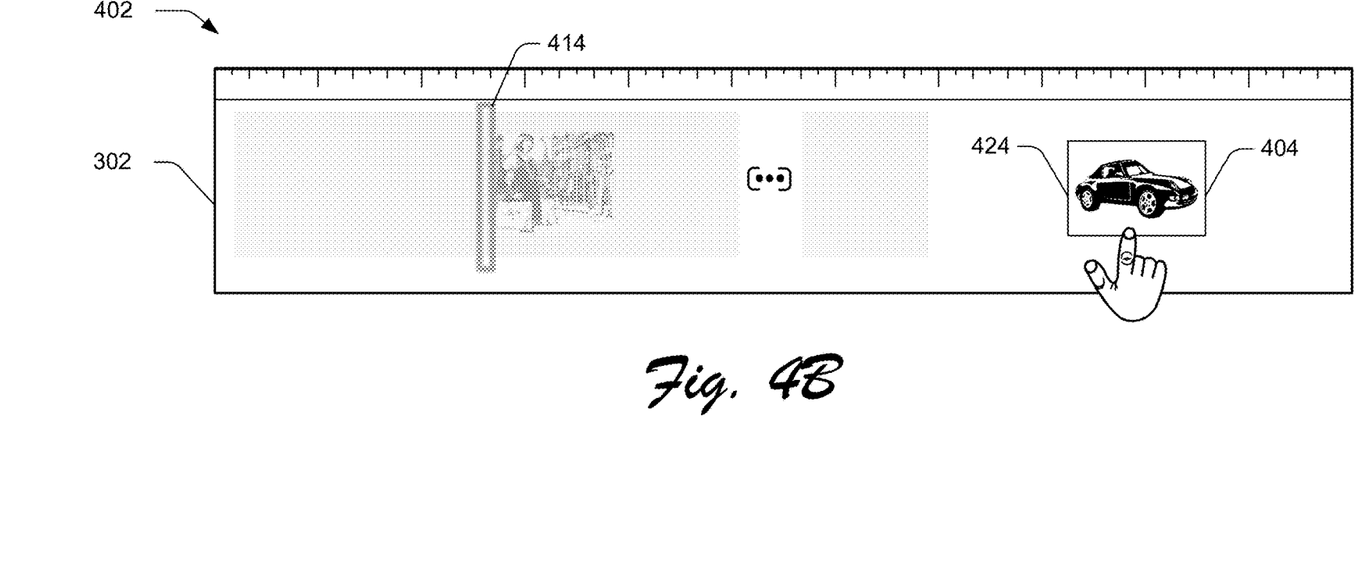
FIG. 4B depicts an example implementation in which a drop zone output module of FIG. 2 is employed to render a predicted drop zone based on user input operations with a graphical object displayed in the example user interface of FIG. 3.
Figure 5:
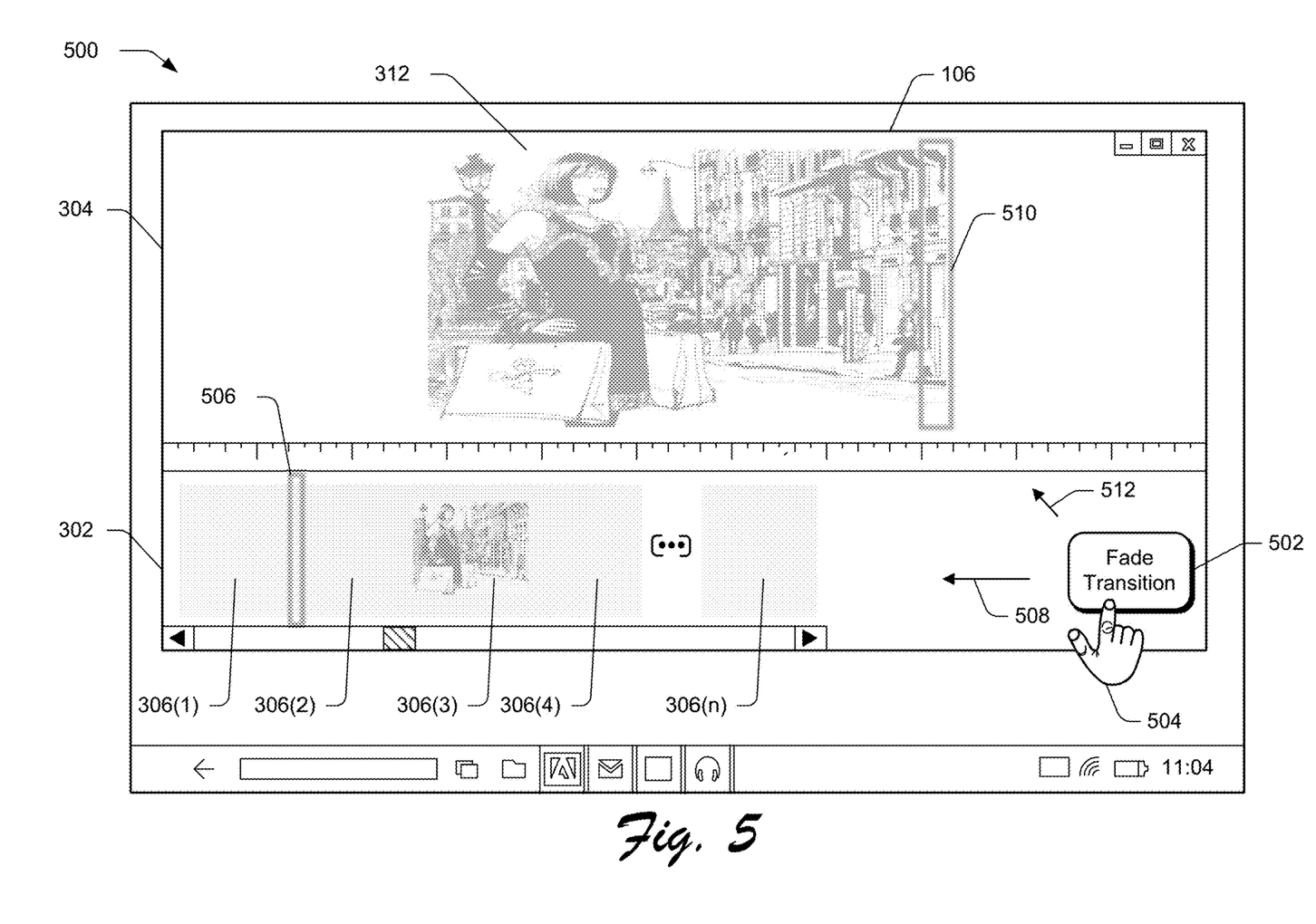
FIG. 5 depicts an example implementation in which a drop zone output module of FIG. 2 is employed to determine potential drop zones in various areas of a user interface based on user input operations with a graphical object displayed in the user interface.

FIG. 4A depicts an example implementation 400 in which multiple predicted drop zones are identified in a user interface and FIG. 4B depicts an example implementation 402 in which a predicted drop zone is visually rendered in the user interface based on user input data generated from monitored user input with a graphical object. In the illustrated examples, the graphical object 404 represents a media object to be added to the timeline of scenes 306(1), 306(2), 306(3), 306(4) . . . 306(n) in the timeline portion 302 of the user interface 106 illustrated in FIG. 3. The graphical object 404 is selected via a pointer, which is illustrated as a user's hand 406. Although illustrated as a user's hand, the hand 406 is representative of any user input pointer, such as a cursor controlled by a mouse, a touchpad, voice commands, and so on. In accordance with one or more implementations, the graphical object 404 is selected from a menu of media objects, such as a menu of media objects displayed in response to selection of the 'Add Media' control 316 of FIG. 3.

In the example implementation 402, user input is initiated upon selection of the graphical object 404 by the hand 406. A computing device implementing the techniques described herein then monitors the user input to determine a location for a predicted drop zone that represents an estimated ending location for the graphical object 404 after the user input has terminated. In the example implementation 402, the user input moves the graphical object 404 from a right side of the timeline portion 302 of a user interface towards the timeline of scenes 306(1), 306(2), 306(3), 306(4) . . . 306(n), as indicated by the arrow 408.

Using user input data generated from the monitored user input, such as data indicating a velocity, acceleration, position, and direction of the graphical object 404 as moved within the timeline portion 302, it is inferred that a user intends to add the graphical object 404 to the timeline of scenes 306(1), 306(2), 306(3), 306(4) . . . 306(n). A computing device implementing the techniques described herein determines potential predicted drop zones 410, 412, 414, 416, 418, 420, and 422 for the graphical object 404 based on the direction of the user input indicated by the arrow 408. For instance, the computing device can ascertain coordinates of different graphical objects representing scenes 306(1), 306(2), 306(3), 306(4) . . . 306(n), and determine that areas of the user interface occupied by these different graphical objects are prohibited areas for a predicted drop zone.

The computing device thus identifies potential drop zone 410 as preceding scene 306(1), potential drop zone 412 as disposed between scenes 306(1) and 306(2), potential drop zone 414 as disposed between scenes 306(2) and 306(3), potential drop zone 416 as disposed between scenes 306(3) and 306(4), potential drop zone 418 as following scene 306(4), potential drop zone 420 as preceding scene 306(n), and potential drop zone 422 as following scene 306(n). In the illustrated example, the predicted drop zones are sized according to an available space in the timeline portion 302 of a user interface relative to the other graphical objects. Alternatively, the potential drop zones 410, 412, 414, 416, 418, 420, and 422 can be sized to correspond to a size of the graphical object 404.

As the user input with the graphical object 404 progresses along the direction indicated by the arrow 408, the computing device determines a location for a predicted drop zone from the potential drop zones 410, 412, 414, 416, 418, 420, and 422 and visually renders the predicted drop zone in the user interface. For instance, FIG. 4B illustrates the example implementation 402 where user input has moved the graphical object 404 along the path 408 to a position 424. From the user input data generated from monitored user input, such as the user input data 116 from FIGS. 1 and 2, the computing device determines that a location for a predicted drop zone corresponds to the potential drop zone 414. The computing device then visually renders the predicted drop zone 414 as disposed in between scenes 306(2) and 306(3) to indicate to the user an anticipation of moving the graphical object 404 to the location illustrated by the predicted drop zone 414.

Using the techniques described herein, the computing device dynamically updates a position of the rendered predicted drop zone based on user input data generated from the received user input. For instance, if the computing device determines that the user input moving the graphical object 404 accelerates along the direction indicated by the arrow 408, a display of the preview portion 302 may be updated to render the predicted drop zone at a further distance from the position 424, such as rendering predicted drop zone 410 instead of the predicted drop zone 414. Conversely, if the computing device determines that the user input moving the graphical object 404 decelerates along the direction indicated by the arrow 408, a display of the preview portion 302 may be updated to render the predicted drop zone at a closer distance to the position 424, such as rendering one of predicted drop zones 416, 418, 420, or 422. Thus, the user input data generated from monitored user input is used to provide display of a predicted drop zone in real-time as the graphical object 404 is moved about a user interface.

By visually rendering a predicted drop zone at the determined location before the user input physically moves the graphical object 404 to the determined location, the techniques described herein enable a user to efficiently and intuitively move graphical objects in a user interface. Upon detecting termination of the user input, the computing device automatically moves the graphical object 404 to the location indicated by the rendered predicted drop zone.

Figure 4C:
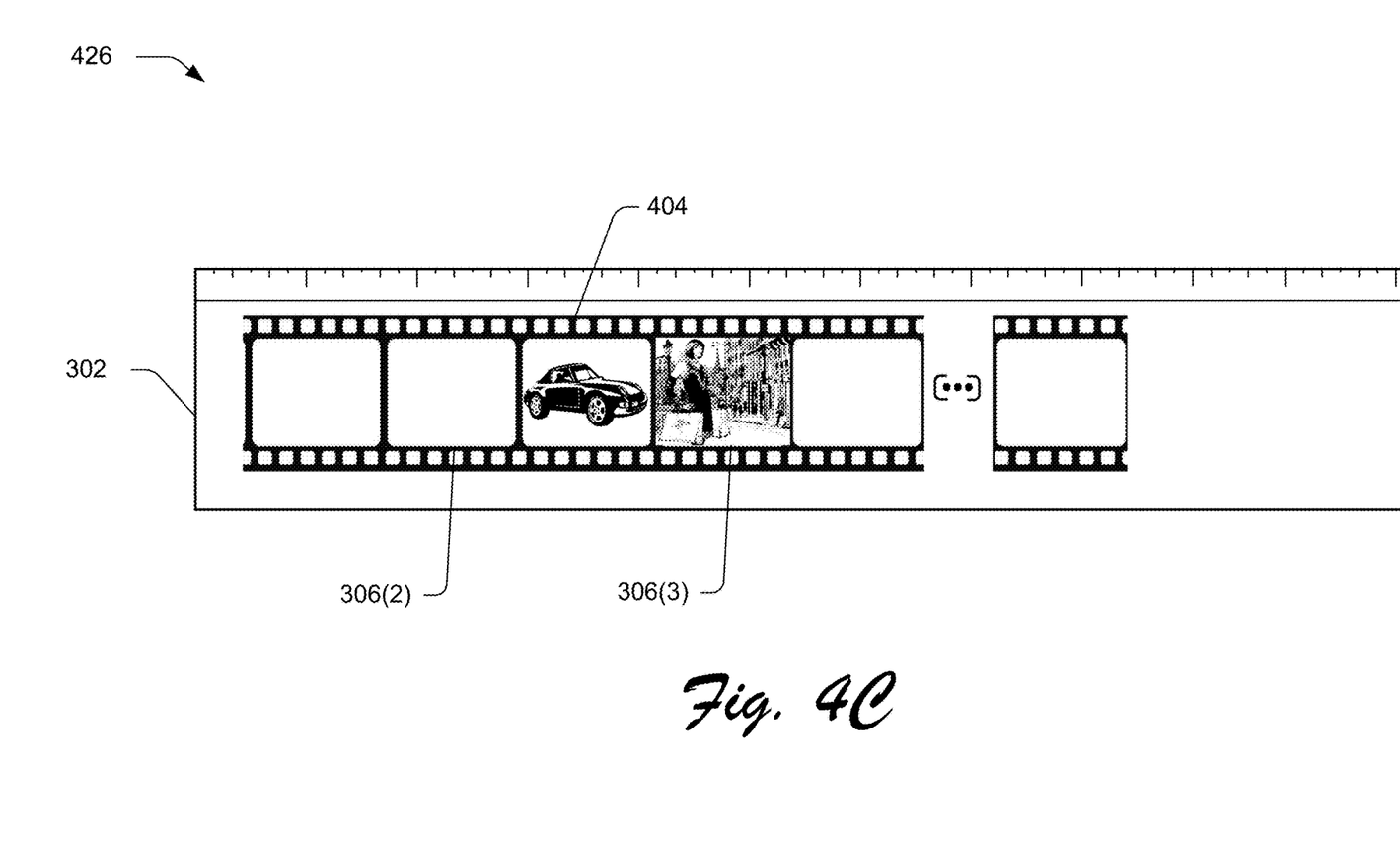
FIG. 4C depicts an example implementation in which a user input processing system of FIG. 1 moves the position of a graphical object to a location of a predicted drop zone upon termination of user input.

FIG. 4C depicts an example implementation 426 in which a graphical object is automatically moved to a predicted drop zone upon termination of user input with the graphical object. In the illustrated example, the timeline portion 302 of a user interface from FIGS. 4A and 4B is updated to include the graphical object 404 in between the graphical objects representing scenes 306(2) and 306(3). For instance, in the example implementation illustrated in FIG. 4B, a computing device implementing the techniques described herein detects termination of user input used to move the graphical object to the location 424 along the path indicated by arrow 408.

Upon detecting termination of the user input, the computing device automatically moves the graphical object to a location in the user interface indicated by a predicted drop zone, such as predicted drop zone 414. Because the predicted drop zone 414 of FIG. 4B is located in between the graphical objects representing scenes 306(2) and 306(3), the computing device automatically moves the graphical object 404 to a corresponding location on the timeline. In the illustrated example, because an adequate area for the graphical object 404 did not previously exist between the scenes 306(2) and 306(3), the computing device is configured to automatically adjust a display position of other graphical objects in the user interface to accommodate for graphical object 404.

Through use of the techniques described herein, a user can easily move a graphical object from a first location to a second location in a user interface without having to physically move the graphical object all the way to the second location. In this manner, the time and effort associated with moving a graphical object is substantially reduced, creating an improved user experience. Further, by rendering the predicted drop zones using the techniques and systems described herein, a user is actively informed in real-time as to a precise location in a user interface where a graphical object is to be moved.

FIG. 5 depicts an example implementation 500 in which predicted drop zones are rendered in various location of a user interface based on user input data generated from received user input with a graphical object. In the illustrated example, the graphical object 502 represents a fade transition for transitioning between scenes in the timeline of scenes 306(1), 306(2), 306(3), 306(4) . . . 306(n). In the illustrated example, the fade transition can be added to the timeline of scenes using either the timeline portion 302 or the preview portion 304 of the user interface 106 illustrated in FIG. 3. The graphical object 502 is selected via a pointer, which is illustrated as a user's hand 504. Although illustrated as a user's hand, the hand 504 is representative of any user input pointer, such as a cursor controlled by a mouse, a touchpad, voice commands, and so on. In accordance with one or more implementations, the graphical object 502 is selected from a menu of media transition objects, such as a menu of media transition objects displayed in response to selection of the 'Add Transition' control 318 of FIG. 3.

In the example implementation 500, user input is initiated upon selection of the graphical object 502 by the hand 504. A computing device implementing the techniques described herein then monitors the user input and generates user input data from the monitored user input to determine a location for a predicted drop zone that represents an estimated ending location for the fade transition after the user input has terminated. In the illustrated example, a location and distance from a starting location of the graphical object 502 is determined based on data describing characteristics of user input with the graphical object 502, such as the user input data 116 of FIGS. 1 and 2.

For instance, using user input data generated from received user input, such as a velocity, an acceleration, a position, and a direction of the graphical object 502 as moved by user input, the predicted drop zone 506 is generated in response to the user input moving the graphical object 502 in the direction indicated by the arrow 508. Alternatively, the computing device generates the predicted drop zone 510 in response to the user input moving the graphical object 502 in the direction indicated by the arrow 512. In the illustrated example, predicted drop zone 506 represents a determined location in the timeline portion 302 for inserting a fade transition between scenes 306(1) and 306(2). Similarly, the predicted drop zone 510 represents a determined location in the preview portion 304 that would implement a fade transition from an end portion of scene 306(3) to the subsequent scene 306(4). Upon detecting termination of the user input, the computing device implementing the techniques described herein ceases rendering of the predicted drop zone automatically moves the fade transition represented by the graphical object 502 to an appropriate location in the user interface as specified by a rendered drop zone.

Thus, the techniques described herein enable movement of a graphical object to any location in a user interface through representations of predicted drop zones to minimize an amount of time and user input required to move the graphical object.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
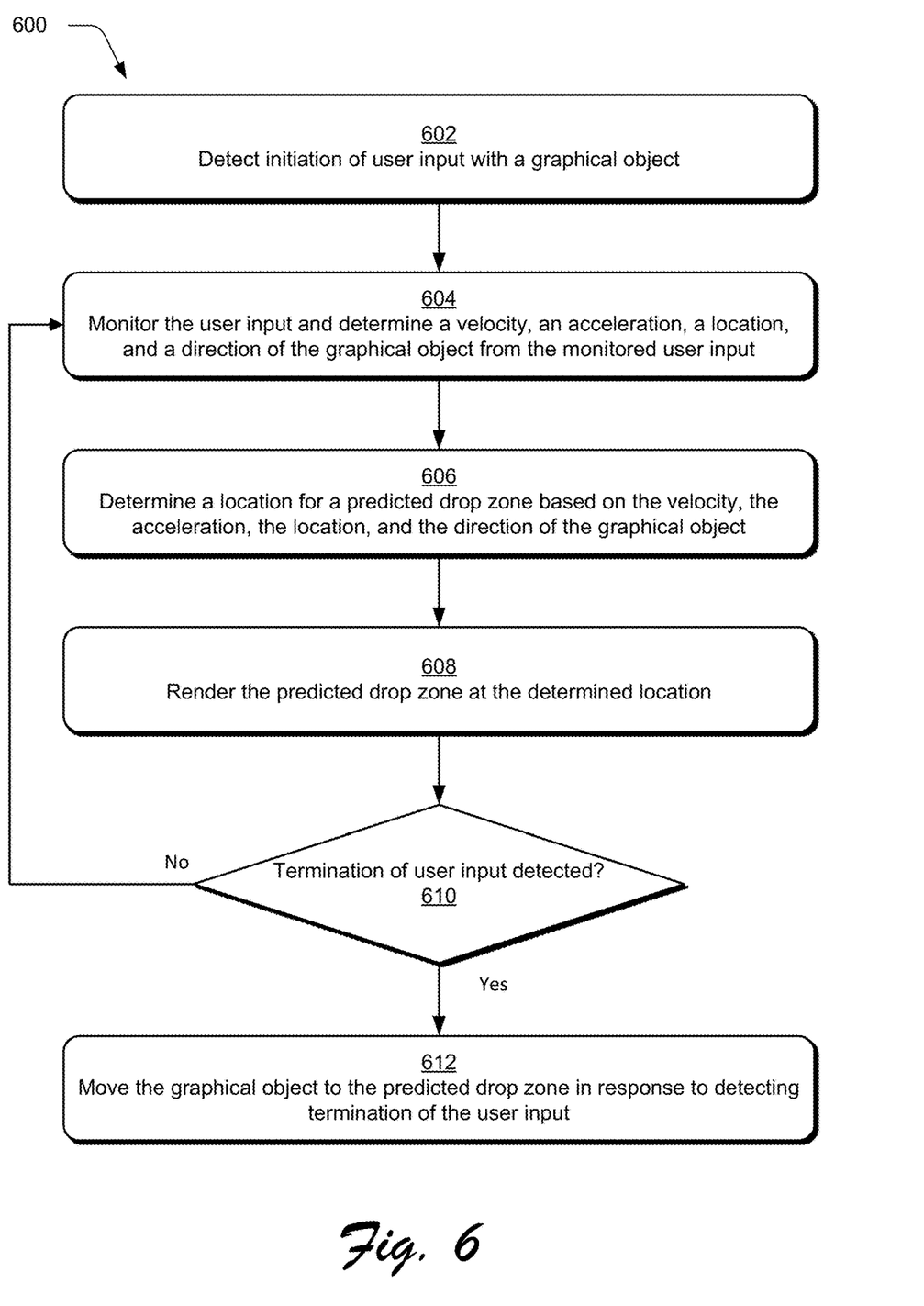
FIG. 6 is a flow diagram depicting a procedure in an example implementation of generating predictive drop zones based on user input operations.

FIG. 6 depicts a procedure 600 in an example implementation of moving graphical objects using predictive drop zones based on user input operations. Initiation of a user input with a graphical object is detected (block 602). The user input processing system 104, for instance, receives a user input 110 from an input device of the computing device 102. For example the user input 110 is initiated with a graphical object such as the graphical object 118 of FIG. 1, the graphical object 404 of FIGS. 4A-C, the graphical object 502 of FIG. 5, and so on.

The user input is monitored to determine a velocity, an acceleration, a location, and a direction of the graphical object from the monitored user input (block 604). For instance, the user input monitoring system 112 generates user input data 116 from received user input 110 by monitoring the user input 110 in real-time as it is received at the computing device 102. The user input data 116 specifies input velocity 202, input acceleration 204, input location 206, and input direction 208, relative to a user interface displayed by the display device 108, such as user interface 106.

Based on the velocity, the acceleration, the location, and the direction of the graphical object as moved by the user input, a location for a predicted drop zone is determined (block 606). The drop zone predicting system 114, for instance, receives the user input data 116 and determines a location in the user interface 106 to specify a predicted ending point for the graphical object after the user input 110 is complete. The location is determined in real-time based on the user input data 116 to account for dynamically changing characteristics of the user input 110.

The predicted drop zone is rendered in the user interface at the determined location (block 608). Continuing with the previous example, the drop zone predicting system 114 visually displays the predicted drop zone 124 on the user interface 106 displayed by the display device 108. The predicted drop zone 124 is rendered at a location in the user interface 106 determined based on drop zone coordinates 216 generated by drop zone generator module 210 and based on object coordinates 218 generated by object detection module 212.

A determination is made as to whether termination of the user input is detected (block 610). For instance, the user input monitoring system 112 continues to monitor the received user input 110 to determine when input with the graphical object has ceased. If termination of the user input 110 is not detected, the monitoring of the user input 110, generation of user input data 116 from the monitored user input, the determining of the location for the predicted drop zone, and the rendering of the predicted drop zone continue to be performed, as indicated by the arrow connecting blocks 610 and 604.

When termination of the user input is detected, the graphical object is moved to the predicted drop zone (block 612). For instance, the user input processing system 104 determines that the user input 110 has terminated and moves the graphical object to the determined location visually indicated by the predicted drop zone 124. The graphical object is thus automatically moved to a location indicated by a predicted drop zone without requiring physical movement of the graphical object to the location itself. A variety of other examples are also contemplated as described above.

Example System and Device

Figure 7:
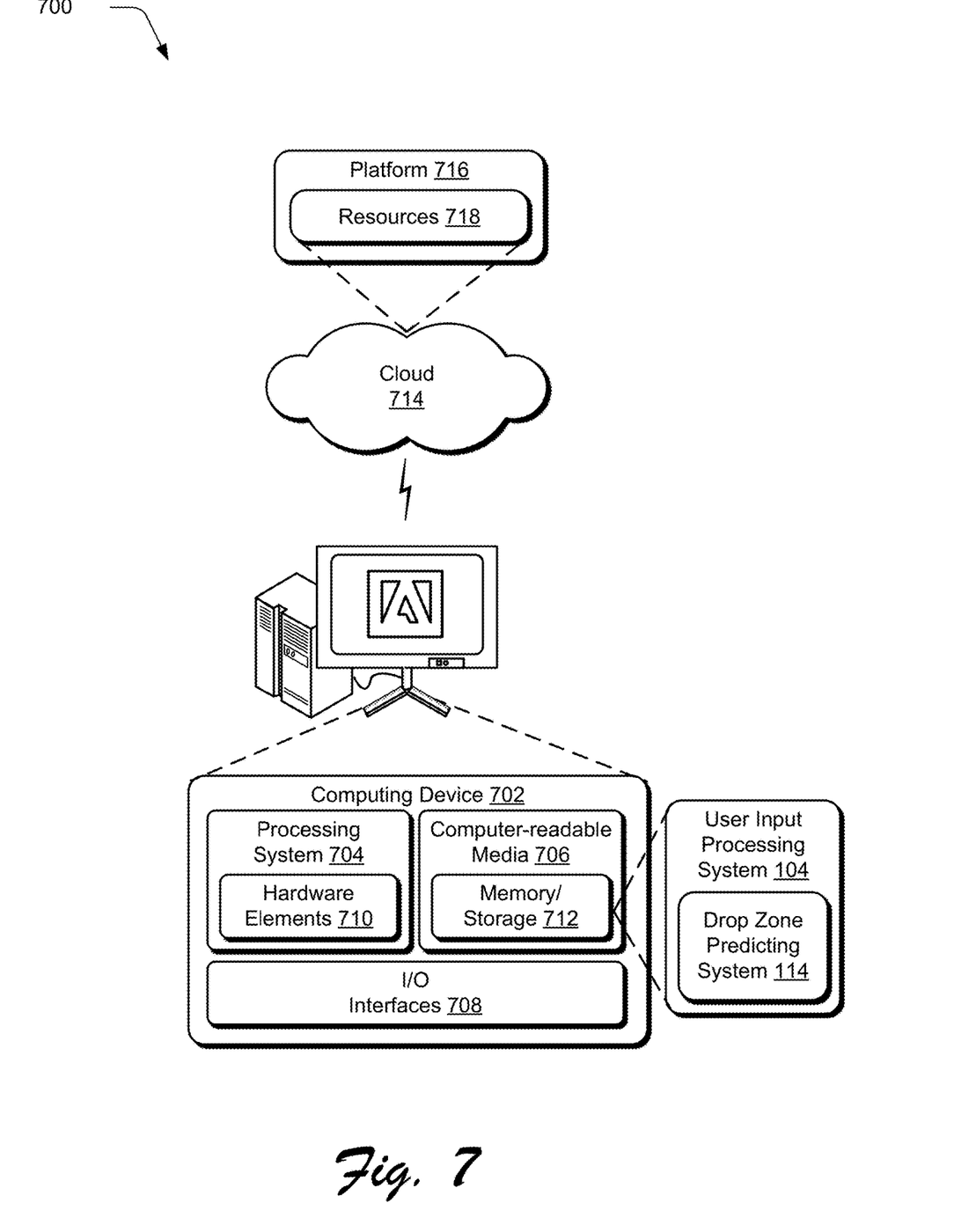
FIG. 7 illustrates an example system including various components of an example device that can be implemented as any type of computing device as described and/or utilize with reference to FIGS. 1-7 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the user input processing system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described systems, modules, and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a user input monitoring system implemented at least partially in hardware of a computing device to determine, from user input with a graphical object in a user interface of the computing device, characteristics describing motion of the graphical object; and
a drop zone predicting system implemented at least partially in hardware of the device to:
determine, based on the characteristics describing motion of the graphical object, a location for a predicted drop zone in the user interface that represents an anticipated ending point of the graphical object, the location for the predicted drop zone being different from both a location of the graphical object and a location of the user input relative to the user interface, the location for the predicted drop zone being positioned at a distance from the location of the graphical object based on an acceleration of the graphical object;
determine, based on the characteristics describing motion of the graphical object, a size for the predicted drop zone;
render a visual representation of the predicted drop zone at the determined location for the predicted drop zone in the user interface, the visual representation of the predicted drop zone having the determined size and rendered at a location in the user interface that does not overlap a different graphical object; and
move the graphical object to the determined location for the predicted drop zone in response to detecting termination of the user input.

2. The system as described in claim 1, wherein the user input comprises a drag and drop operation that is initiated by selecting the graphical object and terminated by releasing the graphical object.

3. The system as described in claim 1, wherein the distance between the rendered visual representation of the predicted drop zone and the graphical object increases as the acceleration of the graphical object increases.

4. The system as described in claim 1, wherein the distance between the rendered visual representation of the predicted drop zone and the graphical object decreases as the acceleration of the graphical object decreases.

5. The system as described in claim 1, wherein the characteristics describing motion of the graphical object include at least one of a velocity of the graphical object, the acceleration of the graphical object, or a direction of the graphical object as moved by the user input.

6. The system as described in claim 1, wherein a shape of the rendered visual representation of the predicted drop zone corresponds to a shape of the graphical object.

7. The system as described in claim 1, wherein the drop zone predicting system is further implemented to:
   identify, in response to recognizing that the determined location for the predicted drop zone overlaps a location of the different graphical object, an adjusted location for the predicted drop zone in the user interface that is adjacent to the different graphical object and does not overlap the different graphical object; and
   render the visual representation of the predicted drop zone at the adjusted location for the predicted drop zone.

8. The system as described in claim 1, wherein the graphical object comprises a media clip or a media clip transition and the user interface comprises a multimedia editor interface.

9. The system as described in claim 1, wherein the location for the predicted drop zone is determined in real-time, the size for the predicted drop zone is determined in real-time, and the rendering of the visual representation of the predicted drop zone is performed in real-time during the user input with the graphical object.

10. The system as described in claim 1, wherein the drop zone predicting system is further implemented to remove the visual representation of the predicted drop zone in response to detecting termination of the user input with the graphical object.

11. A method implemented by a computing device, the method comprising:
   monitoring, by the computing device, user input that moves a graphical object in a user interface and determining a velocity, an acceleration, and a direction of motion of the graphical object from the user input;
   determining, by the computing device, a location for a predicted drop zone in the user interface based on the velocity, the acceleration, and the direction of motion of the graphical object, the location for the predicted drop zone being different from both a location of the graphical object and a location of the user input relative to the user interface, the location for the predicted drop zone being positioned at a distance from the graphical object based on the acceleration of the graphical object;
   determining, by the computing device, a size for the predicted drop zone based on at least one of the velocity or the acceleration of the graphical object;
   rendering, by the computing device, a visual representation of the predicted drop zone at the determined location for the predicted drop zone in the user interface to visually indicate an anticipated ending point of the graphical object, the visual representation of the predicted drop zone being rendered as having the determined size at a location in the user interface that does not overlap a different graphical object; and
   moving, by the computing device, the graphical object to the determined location for the predicted drop zone indicated by the rendering of the visual representation of the predicted drop zone in response to detecting termination of the user input.

12. The method as described in claim 11, wherein determining the location for the predicted drop zone, determining the size for the predicted drop zone, and rendering the visual representation of the predicted drop zone at the determined location for the predicted drop zone are performed in real-time during the user input with the graphical object.

13. The method as described in claim 11, wherein the determined location for the predicted drop zone is in an area of the user interface occupied by the different graphical object and moving the graphical object to the determined location for the predicted drop zone comprises adjusting a display position of the different graphical object to display the graphical object at the determined location for the predicted drop zone.

14. The method as described in claim 11, further comprising reducing the distance between the location of the user input and the determined location for the predicted drop zone in response to detecting a decrease in the acceleration of the user input.

15. A computer-readable storage media device comprising instructions stored thereon that, responsive to execution by at least one processing device, causes the at least one processing device to perform operations comprising:
   monitoring user input with a graphical object in a user interface to determine characteristics describing motion of the graphical object;
   determining, from the characteristics of the user input describing motion of the graphical object, a location for a predicted drop zone in the user interface that represents an anticipated ending point of the graphical object as moved by the user input, the location for the predicted drop zone being different from both a location of the graphical object and a location of the user input relative to the user interface, the location for the predicted drop zone being positioned at a distance from the location of the user input based on an acceleration of the user input;
   determining, from the characteristics of the user input describing motion of the graphical object, a size for the predicted drop zone;
   adjusting the location for the predicted drop zone in response to determining that the location for the predicted drop zone in the user interface overlaps a display of a different graphical object by rendering a visual representation of the predicted drop zone having the determined size at an adjusted location that does not overlap the display of the different graphical object; and
   moving the graphical object to the adjusted location in response to detecting termination of the user input.

16. The computer-readable storage media device of claim 15, wherein the user input comprises a drag and drop operation that is initiated by selecting the graphical object and terminated by releasing the graphical object.

17. The computer-readable storage media device of claim 15, wherein the characteristics describing motion of the graphical object include at least one of a velocity of the graphical object, an acceleration of the graphical object, a location of the graphical object, or a direction of the graphical object as moved by the user input.

18. The computer-readable storage media device of claim 15, the operations further comprising determining that the location for the predicted drop zone is positioned between two different objects in the user interface, wherein rendering the visual representation of the predicted drop zone at the adjusted location comprises reducing the size of the visual representation of the predicted drop zone to fit between the two different objects.

19. The computer-readable storage media device of claim 15, wherein a shape of the rendered visual representation of the predicted drop zone corresponds to a shape of the graphical object.

20. The computer-readable storage media device of claim 15, wherein the distance between the location for the predicted drop zone and the location of the user input increases as the acceleration of the user input increases.

21. The computer-readable storage media device of claim 15, the operations further comprising ceasing display of the visual representation of the predicted drop zone in response to detecting termination of the user input.

\* \* \* \* \*